Figure 1:
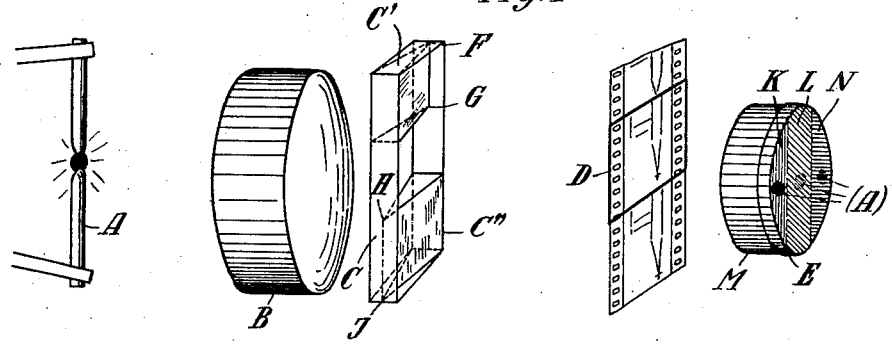

Dec. 18, 1934.  G. HEYMER  1,984,481

APPARATUS FOR PROJECTING LENTICULAR FILMS

Filed Nov. 12, 1930

Inventor:
Gerd Heymer,
By Philip S. Hopkins,
Attorney.

Patented Dec. 18, 1934

1,984,481

UNITED STATES PATENT OFFICE 1,984,481

APPARATUS FOR PROJECTING LENTICULAR FILMS

Gerd Heymer, Dessau-Ziebigk in Anhalt, Germany, assignor to Agfa Ansco Corporation, Binghamton, N. Y., a corporation of New York Application November 12, 1930, Serial No. 495,209
In Germany November 21, 1929

7 Claims. (Cl. 88—16.4)

My present invention relates to projection and more particularly projection of lenticular films.

One of its objects is a new apparatus for projecting lenticular films as used in Berthon's process and disclosed, for instance, in U. S. Patent No. 992,151.

Additional objects will be seen from the detailed specification following hereafter.

In the known Berthon process for projecting colored pictures imprinted on a lenticular film, a filter comprising several parallel areas of different colors is provided in front of the objective of the projection apparatus. Now, difficulties arise in permanently illuminating the projection screen in a completely white light, that is to say, without any predominant colors.

Colored fringes are, for instance, frequently produced at the sides of the projection screen which fringes are parallel to the direction of the stripes of the multi-color filter.

When an electric arc is used as source of light for the projection, an image of the mirror or of the condenser is projected onto the multi-color filter if the latter is placed in front of the objective, whereas the image of the crater projected by the mirror or the condenser lies near the film. When the arc flickers occasionally, the mirror or the condenser is irregularly illuminated even in case a regular illumination has been obtained before. Since the image of the condenser or the mirror lies on the filter or in its vicinity, the brightness which is irregularly distributed over the filter manifests itself in the appearance of undesired colors in the projection field.

Now I have found that this defect may be obviated when taking care that the fluctuations of intensity of the light source are not noticeable on the plane of the projection filters as alterations in the distribution of intensity of light in the several differently colored light filters. This effect is reached simply by transferring the real images, projected by the condenser or mirror and in some cases by parts of the projection objective, from the crater of an electric arc or from the incandescent filament of a lamp in the plane of the filters.

It has proved to be advantageous to project on each area of the multi-color filter a separate image of the source of light. This may be achieved, for instance, by inserting prisms between the mirror or condenser and the film. But it is also possible to subdivide the mirror or condenser into as many parts as the multi-color filter contains stripes, each part having its own focus, which in each case, lies in one stripe of the filter.

The described principle may likewise be applied to the projection by means of incandescent lamps especially in the case of projection apparatus for narrow films. For this purpose according to my invention, lamps are preferably used which have a number of parallel wire spirals corresponding in number to the filter areas; a picture of each of these spirals is projected on each stripe of the multi-color filter.

Figure 2:
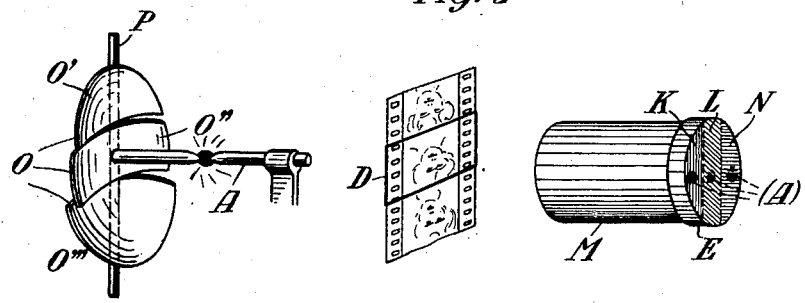
Figure 3:
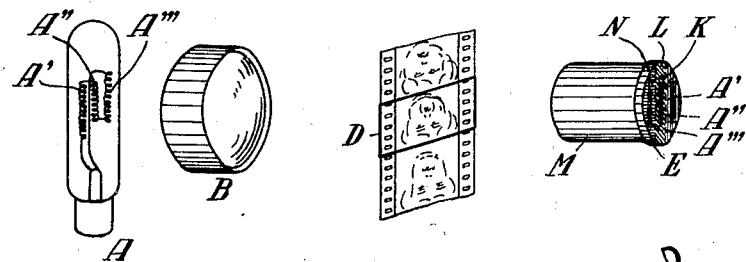

My invention is illustrated by the accompanying drawing in which Figs. 1 to 3 show diagrammatically three embodiments of it. The same reference characters are used in the different figures to indicate the same or analogous parts.

In Fig. 1 the light source A is an arc lamp the beams of which strike through the condenser B upon a system of prisms C. At its upper end the system comprises a prism C' the angle of refraction of which is at F—G from which a part of the light is projected through the film door D and the projection objective M on the red part K of the color filter E placed on the front of the projection objective M. In the lower part of the system C another prism C'' is arranged with the refracting angle at H—J from which a part of the light is projected on the blue stripe N of the color filter. The middle part of the system C is opened and here the light strikes directly through the film door D and the objective M on the green area L of the filter. In this manner an image of the light arc A is projected on each stripe K, L and N of the multi-color filter E at (A).

According to Fig. 2 the light of the light arc A is reflected by a concave mirror O and strikes through the film door D and the projection objective M bearing on its front the color filter E consisting of three color areas K, L and N. The concave mirror is broken in three parts O', O'' and O''' which are capable of being turned on the perpendicular axis P. By a suitable adjustment of the mirror parts O', O'' and O''' a corresponding part of the light emanated from the light source A is projected on the color areas K, L, N of the color filter E and in each area an image of the arc is seen at (A).

In Fig. 3 the source of light A consists of three parallel wire spirals A', A'' and A''' from which after having passed the condenser B, the film door D and the projection objective M an image of one of the spiral wires is projected in the single color areas at (A'), (A'') and (A'''). The number of wire spirals corresponds to the number of the color areas of the light filter E.

What I claim is:—

1. In an apparatus for projection in operative combination, a lenticular film, a source of light illuminating said lenticular film, an objective arranged in front of said lenticular film for projecting the same, a multi-color filter for projecting said lenticular film in natural colors comprising a plurality of areas of different color and being arranged in front of said objective, and means for forming an equal number of separate sharp images of at least a part of said source of light and projecting one of said images separately on each of said filter color areas.

2. In an apparatus for projection in operative combination, a lenticular film, a source of light illuminating said lenticular film, an objective arranged in front of said lenticular film for projecting the same, a multi-color filter for projecting said lenticular film in natural colors comprising areas of different color and being arranged in front of said objective, a condenser and a system of prisms between said source of light and said film, said system of prisms having an aperture and adjacent to the aperture a number of prisms corresponding to the number of color areas except one of said multi-color filter, said source of light, said condenser, said system of prisms, said objective and said multi-color filter cooperating so as to project an image of said source of light on each color area of said multi-color filter.

3. In an apparatus for projection in operative combination, a lenticular film, a source of light illuminating said lenticular film, an objective arranged in front of said lenticular film for projecting the same, a three-color filter for projecting said lenticular film in natural colors comprising three areas of different color and being arranged in front of said objective, a condenser and a system of prisms between said source of light and said film, said system of prisms having an aperture and adjacent to the aperture two prisms, said source of light, said condenser, said system of prisms, said objective and said three-color filter cooperating so as to project an image of said source of light on each color area of said three-color filter.

4. In an apparatus for projection in operative combination, a lenticular film, a source of light illuminating said lenticular film, an objective arranged in front of said lenticular film for projecting the same, a multi-color filter for projecting said lenticular film in natural colors comprising areas of different color and being arranged in front of said objective, a concave mirror arranged behind said source of light on the side removed from the film, said mirror consisting of as many parts as correspond to the number of color areas of said multi-color filter, each of said parts being adjustable for projection, said mirror, said source of light, said condenser, said objective and said multi-color filter cooperating so as to project an image of said source of light on each area of said multi-color filter.

5. In an apparatus for projection in operative combination, a lenticular film, a source of light illuminating said lenticular film, an objective arranged in front of said lenticular film for projecting the same, a three-color filter for projecting said lenticular film in natural colors comprising three areas of different color and being arranged in front of said objective, a concave mirror arranged behind said source of light on the side removed from the film, said mirror consisting of three parts, each of said parts being adjustable for projection, said mirror, said source of light, said condenser, said objective, and said three-color filter cooperating so as to project an image of said source of light on each area of said three-color filter.

6. In an apparatus for projection in operative combination, a lenticular film, a source of light illuminating said lenticular film, an objective arranged in front of said lenticular film for projecting the same, a multi-color filter for projecting said lenticular film in natural colors comprising areas of different color and being arranged in front of said objective, said source of light being an incandescent lamp comprising as many wire spirals as has the multi-color filter color areas, a condenser arranged between said source of light and said film, said source of light, said condenser, said objective and said multi-color filter cooperating so as to project on each area of said multi-color filter an image of one wire coil of said source of light.

7. In an apparatus for projection in operative combination, a lenticular film, a source of light illuminating said lenticular film, an objective arranged in front of said lenticular film for projecting the same, a three-color filter for projecting said lenticular film in natural colors comprising three areas of different color and being arranged in front of said objective, said incandescent lamp comprising three wire spirals, a condenser arranged between said source of light and said film, said source of light, said condenser, said objective and said three-color filter cooperating so as to project on each area of said three-color filter an image of one wire coil of said source of light.

GERD HEYMER.